(12) United States Patent
Guo

(10) Patent No.: US 9,242,211 B2
(45) Date of Patent: Jan. 26, 2016

(54) CATALYSTS POSSESSING AN IMPROVED RESISTANCE TO POISONING

(75) Inventor: Xiaoyu Guo, Strongsville, OH (US)

(73) Assignee: The Babcock & Wilcox Company, Barberton, OH (US)

(*) Notice: Subject to any disclaimer, the term of this patent is extended or adjusted under 35 U.S.C. 154(b) by 965 days.

(21) Appl. No.: 13/190,105

(22) Filed: Jul. 25, 2011

(65) Prior Publication Data

US 2012/0308459 A1 Dec. 6, 2012

Related U.S. Application Data

(60) Provisional application No. 61/491,292, filed on May 30, 2011.

(51) Int. Cl.
*B01J 23/00* (2006.01)
*B01J 23/22* (2006.01)
*B01J 23/30* (2006.01)
(Continued)

(52) U.S. Cl.
CPC .............. *B01D 53/9418* (2013.01); *B01J 23/30* (2013.01); *B01J 23/8885* (2013.01); *B01J 37/0009* (2013.01); *B01J 37/0036* (2013.01); *B01J 37/0201* (2013.01); *B01J 37/024* (2013.01); *B01D 2251/2062* (2013.01); *B01D 2255/207* (2013.01); *B01D 2255/20707* (2013.01); *B01D 2255/20723* (2013.01); *B01D 2255/20746* (2013.01); *B01D 2255/20769* (2013.01); *B01D 2255/20776* (2013.01)

(58) Field of Classification Search
CPC .......... B01J 21/063; B01J 23/00; B01J 23/22; B01J 23/30; B01J 23/75; B01J 23/8472; B01J 23/8474; B01J 23/888; C01B 21/00; C01B 21/02; C01B 21/20; B01D 53/56; B01D 53/94; B01D 53/9418
USPC ............ 502/309, 311–313; 423/213.2, 213.5, 423/239.1
IPC .................... B01J 21/063, 23/28, 23/30, 23/84, B01J 23/882, 23/888
See application file for complete search history.

(56) References Cited

U.S. PATENT DOCUMENTS 4,018,706 A * 4/1977 Inoue et al. ................... 502/248
4,910,005 A * 3/1990 Heins et al. ............... 423/239.1
(Continued)

FOREIGN PATENT DOCUMENTS

CA 2010970 A1 8/1990
CN 17815594 A 6/2006
(Continued)

OTHER PUBLICATIONS

New Zealand Office Action dated Sep. 2, 2014 in corresponding New Zealand Patent Application No. 618395.
(Continued)

*Primary Examiner* — Patricia L Hailey
(74) *Attorney, Agent, or Firm* — Eric Marich

(57) ABSTRACT

The present invention relates generally to the field of catalysts for use in connection with one or more types of emissions control (e.g., emissions control associated with the combustion of one or more types of fossil fuel) and, in particular to catalyst compositions that possess an improved resistance to at least one type of poisoning. In another embodiment, the catalysts of the present invention are designed to be utilized in conjunction with an SCR and possess an improved resistance to phosphorus poisoning.

49 Claims, 3 Drawing Sheets

(51) Int. Cl.
*B01J 23/75* (2006.01)
*C01B 21/00* (2006.01)
*C01B 21/02* (2006.01)
*C01B 21/20* (2006.01)
*B01D 53/56* (2006.01)
*B01D 53/94* (2006.01)
*B01J 37/02* (2006.01)
*B01J 23/888* (2006.01)
*B01J 37/00* (2006.01)

(56) References Cited

U.S. PATENT DOCUMENTS

| | | | |
|---|---|---|---|
| 5,120,695 A * | 6/1992 | Blumrich et al. | 502/78 |
| 5,496,788 A | 3/1996 | Domesle et al. | |
| 5,744,113 A * | 4/1998 | Hums | 423/239.1 |
| 5,753,582 A | 5/1998 | Garcin et al. | |
| 5,827,489 A | 10/1998 | Garcin et al. | |
| 5,958,829 A | 9/1999 | Domesle et al. | |
| 6,054,408 A | 4/2000 | Hums et al. | |
| 6,419,889 B1 | 7/2002 | Boxhoorn et al. | |
| 7,264,784 B2 | 9/2007 | Kuma et al. | |
| 7,361,622 B2 | 4/2008 | Benderly et al. | |
| 7,414,149 B2 | 8/2008 | DeCourcy et al. | |
| 7,485,272 B2 * | 2/2009 | Driscoll et al. | 423/213.2 |
| 7,842,266 B2 * | 11/2010 | Takahashi et al. | 423/212 |
| 7,842,644 B2 | 11/2010 | Kai et al. | |
| 8,202,481 B2 | 6/2012 | Nochi et al. | |
| 8,465,713 B2 * | 6/2013 | Schermanz et al. | 423/239.1 |
| 2001/0023585 A1 | 9/2001 | Dolling et al. | |
| 2002/0025905 A1 * | 2/2002 | Harris et al. | 502/309 |
| 2007/0106089 A1 | 5/2007 | Benderly et al. | |
| 2009/0233787 A1 | 9/2009 | Hartenstein et al. | |
| 2010/0273643 A1 | 10/2010 | Gadgil et al. | |
| 2011/0250114 A1 * | 10/2011 | Augustine et al. | 423/239.1 |
| 2013/0205743 A1 * | 8/2013 | Sobolevskiy | 60/39.5 |
| 2014/0105803 A1 * | 4/2014 | Hong et al. | 423/239.1 |

FOREIGN PATENT DOCUMENTS

| | | | |
|---|---|---|---|
| CN | 101396655 A | 4/2009 | |
| CN | 101972647 A | 2/2011 | |
| EP | 2243540 A1 | 10/2010 | |
| EP | 2444142 A2 | 4/2012 | |
| RU | 2058814 C1 | 4/1996 | |
| RU | 2115470 | 7/1998 | |
| RU | 2406567 C1 | 12/2010 | |
| WO | 2012/166480 A1 | 12/2012 | |
| WO | 2012/166543 * | 12/2012 | B01J 21/00 |

OTHER PUBLICATIONS

English translation of Kazakhstan Office Action dated Dec. 12, 2014 in corresponding Kazakhstan Patent Application No. 2013/1665.1.
English translation of Chinese Office Action dated Jan. 21, 2015 in corresponding Chinese Patent Application No. 201280026619.9.
English translation of Colombian Office Action dated Jan. 30, 2015 in corresponding Colombian Patent Application No. 201280026619.9.
Extended European Search Report (EESR) dated Jul. 9, 2015 in corresponding EPO Patent Application No. 12792019.7.

* cited by examiner

CATALYSTS POSSESSING AN IMPROVED RESISTANCE TO POISONING

RELATED APPLICATION DATA

This patent application claims priority to U.S. Provisional Patent Application No. 61/491,292 filed May 30, 2011 and titled "Catalysts Possessing an Improved Resistance to Poisoning." The complete text of this patent application is hereby incorporated by reference as though fully set forth herein in its entirety.

FIELD AND BACKGROUND OF THE INVENTION

1. Field of the Invention

The present invention relates generally to the field of catalysts for use in connection with one or more types of emissions control (e.g., emissions control associated with the combustion of one or more types of fossil fuel) and, in particular to catalyst compositions that possess an improved resistance to at least one type of poisoning. In another embodiment, the catalysts of the present invention are designed to be utilized in conjunction with an SCR and possess an improved resistance to phosphorus poisoning.

2. Description of the Related Art $NO_x$ refers to the cumulative emissions of nitric oxide (NO), nitrogen dioxide ($NO_2$) and trace quantities of other nitrogen oxide species generated during combustion. Combustion of any fossil fuel generates some level of $NO_x$ due to high temperatures and the availability of oxygen and nitrogen from both the air and fuel. $NO_x$ emissions may be controlled using low $NO_x$ combustion technology and post-combustion techniques. One such post-combustion technique involves selective catalytic reduction (SCR) systems in which a catalyst facilitates a chemical reaction between $NO_x$ and a reagent (usually ammonia) to produce molecular nitrogen and water vapor.

SCR technology is used worldwide to control $NO_x$ emissions from combustion sources. This technology has been used widely in Japan for $NO_x$ control from utility boilers since the late 1970's, in Germany since the late 1980's, and in the US since the 1990's. Industrial scale SCRs have been designed to operate principally in the temperature range of 500° F. to 900° F., but most often in the range of 550° F. to 750° F. SCRs are typically designed to meet a specified $NO_x$ reduction efficiency at a maximum allowable ammonia slip. Ammonia slip is the concentration, expressed in parts per million by volume, of unreacted ammonia exiting the SCR.

For additional details concerning $NO_x$ removal technologies used in the industrial and power generation industries, the reader is referred to *Steam/its generation and use*, 41st Edition, Kitto and Stultz, Eds., Copyright 2005, The Babcock & Wilcox Company, Barberton, Ohio, U.S.A., particularly Chapter 34—Nitrogen Oxides Control, the text of which is hereby incorporated by reference as though fully set forth herein.

Regulations issued by the EPA promise to increase the portion of utility boilers equipped with SCRs. SCRs are generally designed for a maximum efficiency of about 90%. This limit is not set by any theoretical limits on the capability of SCRs to achieve higher levels of $NO_x$ destruction. Rather, it is a practical limit set to prevent excessive levels of ammonia slip. This problem is explained as follows.

In an SCR, ammonia reacts with $NO_x$ according to the following stoichiometric reactions (a) to (c):

$$4NO+4NH_3+O_2 \rightarrow 4N_2+6H_2O \quad \text{(a)}$$

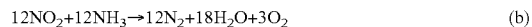

$$12NO_2+12NH_3 \rightarrow 12N_2+18H_2O+3O_2 \quad \text{(b)}$$

$$2NO_2+4NH_3+O_2 \rightarrow 3N_2+6H_2O \quad \text{(c)}.$$

The above catalysis reactions occur using a suitable catalyst. Suitable catalysts are discussed in, for example, U.S. Pat. Nos. 5,540,897; 5,567,394; and 5,585,081 to Chu et al., all of which are hereby incorporated by reference as though fully set forth herein. Catalyst formulations generally fall into one of three categories: base metal, zeolite and precious metal.

Although not limited thereto, a wide range of SCR catalysts use titanium oxide with small amounts of vanadium, molybdenum, tungsten or a combination of several other active chemical agents. The base metal catalysts are selective and operate in the specified temperature range. The major drawback of the base metal catalyst is its potential to oxidize $SO_2$ to $SO_3$; the degree of oxidation varies based on catalyst chemical formulation. The quantities of $SO_3$ which are formed can react with the ammonia carryover/slip to form various ammonium-sulfate salts.

Zeolite catalysts are aluminosilicate materials which function similarly to base metal catalysts. One potential advantage of zeolite catalysts is their higher operating temperature of about 970° F. (521° C.). These catalysts can also oxidize $SO_2$ to $SO_3$ and must be carefully matched to the flue gas conditions.

Precious metal catalysts are generally manufactured from platinum and rhodium. Precious metal catalysts also require careful consideration of flue gas constituents and operating temperatures. While effective in reducing $NO_x$, these catalysts can also act as oxidizing catalysts, converting CO to $CO_2$ under proper temperature conditions. However, $SO_2$ oxidation to $SO_3$ and high material costs often make precious metal catalysts less attractive.

As is known to those of skill in the art, various SCR catalysts undergo poisoning when they become contaminated by various compounds including, but not limited to, any one or more phosphorus compounds selected from inorganic phosphates, organic phosphates, monophosphate compounds, polyphosphate compounds, phosphorus oxide (PO), phosphorus pentoxide ($P_2O_5$), (ortho)phosphoric acid ($H_3PO_4$), pyrophosphoric acid ($H_4P_2O_7$), (ortho)phosphorous acid ($H_3PO_3$), other forms of phosphoric acid, and/or combinations of two or more thereof.

More particularly, as the SCR catalysts are exposed to the dust laden flue gas there are numerous mechanisms including blinding, masking and poisoning that deactivates the catalyst and causes a decrease in the catalyst's performance over time. The most common catalyst poison encountered when burning eastern domestic coal (i.e., coal mined in the eastern United States) is arsenic. The most common catalyst poison encountered when burning western domestic coal (i.e., coal mined in the western United States) is phosphorus, and calcium sulfate is the most common masking mechanism. One method of recycling the used catalyst is the process called regeneration washing or rejuvenation. The initial steps of the regeneration process involve the removal of these toxic chemicals by processing the catalysts through various chemical baths in which the poisons are soluble. While this treatment process does an excellent job of removing the desired poisons it produces wastewater with very high concentrations of unwanted, or poisonous, elements and/or compounds including, but not limited to, arsenic, phosphorus, sodium, potassium, magnesium, vanadium and/or sulfur.

In another situation, Powder River Basin/Lignite coal plants (sometimes referred to PRB coal plants), any coal/biomass co-combustion, or any coal/bone meal co-combustion or even pure biomass combustion power plants will suffer from phosphorus contamination of their SCR catalysts.

Additionally, beyond controlling $NO_x$ emissions, other emission controls must be considered and/or met in order to comply with various state, EPA and/or Clean Air Act regulations. Some other emission controls which need to be considered for boilers, heaters, kilns, or other flue gas-, or combustion gas-, generating devices (e.g., those located at power plants, processing plants, etc.) include, but are not limited to, mercury, $SO_x$, and certain particulates.

Given the above, a need exists for a catalyst composition that possesses an improved resistance to phosphorus poisoning.

SUMMARY OF THE INVENTION

The present invention relates generally to the field of catalysts for use in connection with one or more types of emissions control (e.g., emissions control associated with the combustion of one or more types of fossil fuel) and, in particular to catalyst compositions that possess an improved resistance to at least one type of poisoning. In another embodiment, the catalysts of the present invention are designed to be utilized in conjunction with an SCR and possess an improved resistance to phosphorus poisoning.

Accordingly, one aspect of the present invention is drawn to a catalyst composition comprising: (i) at least one vanadium compound or metal; (ii) at least one tungsten compound or metal; (iii) at least one titanium compound or metal; and (iv) at least one additional compound selected from one or more molybdenum compounds or metal, one or more cobalt compounds or metal, one or more niobium compounds or metal, or mixtures of two or more thereof, wherein the molar ratio of the metal portion of component (iv) to the metal portion of component (i) is in the range of about 10:1 to about 1:10.

In yet another aspect of the present invention, there is provided a catalyst composition comprising: (i) at least one vanadium compound or metal; (ii) at least one tungsten compound or metal; (iii) at least one titanium compound or metal; and (iv) at least one additional compound selected from one or more molybdenum compounds or metal, one or more cobalt compounds or metal, one or more niobium compounds or metal, or mixtures of two or more thereof, wherein the molar ratio of the metal portion of component (iv) to the metal portion of component (i) is in the range of about 10:1 to about 1:10, wherein the molar ratio of the metal portion of component (iv) to the metal portion of component (ii) is about 3:1 to about 1:35, and wherein the molar ratio of the metal portion of component (iv) to the metal portion of component (iii) is in the range of about 1:1 to about 1:2000.

In yet another aspect of the present invention there is provided a catalyst composition according to any of the embodiments shown and described herein.

In yet another aspect of the present invention, there is provided a method for increasing the active life of a catalyst and/or preventing, reducing, mitigating and/or controlling phosphorus poisoning in a catalyst, the method comprising the steps of: (a) providing at least one catalyst composition, the catalyst composition comprising: (i) at least one vanadium compound or metal; (ii) at least one tungsten compound or metal; (iii) at least one titanium compound or metal; and (iv) at least one additional compound selected from one or more molybdenum compounds or metal, one or more cobalt compounds or metal, one or more niobium compounds or metal, or mixtures of two or more thereof, wherein the molar ratio of the metal portion of component (iv) to the metal portion of component (i) is in the range of about 10:1 to about 1:10; and (b) supplying a $NO_x$-containing gas to the catalyst and at least one other compound to permit the catalyst to control $NO_x$ by the conversion of $NO_x$ into another nitrogen compound or nitrogen ($N_2$) gas, wherein the catalyst composition is resistant to phosphorus poisoning.

In yet another aspect of the present invention, there is provided a method as described above, wherein the at least one other compound is ammonia and the catalyst composition is an SCR catalyst.

In yet another aspect of the present invention, there is provided a method as described above, wherein the method is applied to combustion, waste or flue gasses of a combustion process selected from a fossil fuel powered combustion process, a biomass combustion process, or a waste combustion process. In another embodiment, there is provided a method as described above, wherein the method is applied to any type of fossil fuel combustion, fossil fuel waste gasses or fossil fuel flue gasses regardless of combustion source. For example, in one embodiment, the present invention can be applied to mobile combustion sources that are contained in any type of combustion-based vehicle.

In yet another aspect of the present invention, there is provided a method for increasing the active life of a catalyst and/or preventing, reducing, mitigating and/or controlling phosphorus poisoning in a catalyst, the method as shown and described herein.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

Figure 1:
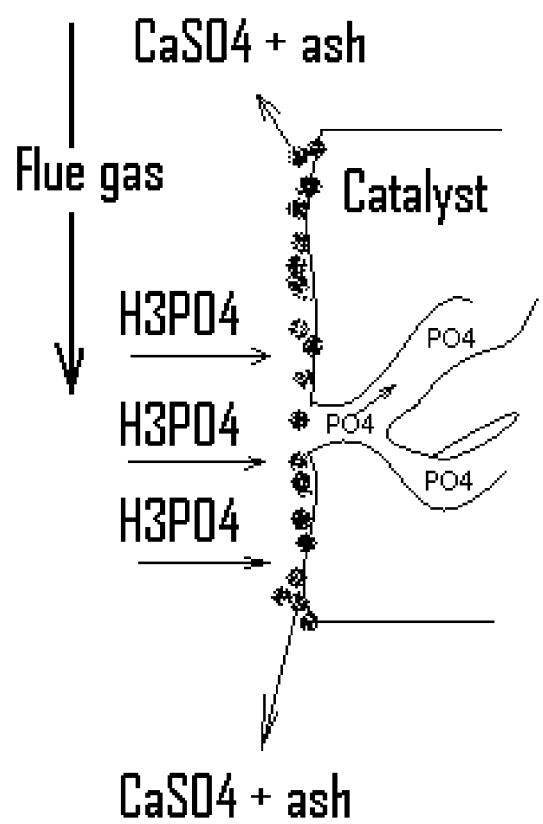
FIG. 1 is an illustration that depicts one possible gas-phase phosphorus poisoning mechanism.

While the present invention will be described in terms of SCR systems which use ammonia as the $NO_x$ reducing agent, since ammonia is frequently preferred for economic reasons, the present invention is not limited to ammonia based systems. The concepts of the present invention can be used in any system which uses an ammoniacal compound. As used in the present disclosure, an ammoniacal compound is a term meant to include compounds such as urea, ammonium sulfate, cyanuric acid, and organic amines as well as ammonia ($NH_3$). These compounds could be used as reducing agents in addition to ammonia, but as mentioned above, ammonia is frequently preferred for economic reasons. Some non-ammoniacal compounds such as carbon monoxide or methane can be used as well, but with loss in effectiveness. As used herein the ammoniacal and non-ammoniacal compounds disclosed herein that are useful as reducing agents to control $NO_x$ are referred to as "at least one other compound to permit the catalyst to control $NO_x$ by the conversion of $NO_x$ into another nitrogen compound or nitrogen ($N_2$) gas."

Although the present invention is described in relation to a boiler, or a fossil fuel boiler, it is not limited solely thereto. Instead, the present invention can be applied to any combustion source that generates $NO_x$ regardless of whether such a combustion source is utilized in conjunction with a boiler, a steam generator, or any type of mobile combustion source (e.g., a combustion engine in a motor vehicle). For example, the present invention could be used in combination with a kiln, a heater, or any other type of combustion process that generates, in whole or in part, a flue gas or combustion gas containing $NO_x$. Accordingly, the description below is to be construed as merely exemplary.

While not wishing to be bound to any one emission control setup, the present invention may be applied to a boiler installation which employs a wet flue gas desulfurization (WFGD or wet scrubber) for removal of sulfur oxides from the flue gases. In this configuration, the wet scrubber is typically preceded (with respect to a direction of flue gas flow through the system) by a particulate collection device (PCD), advantageously a fabric filter (FF) or bag house, or an electrostatic precipitator (ESP). If desired, there may also be provided a wet electrostatic precipitator (wet ESP or WESP) which may be provided as a final "polishing" stage for fine particulate or $SO_3$. Alternatively, the present invention may be applied to a system which employs a spray dryer apparatus (SDA) or dry scrubber for removal of sulfur oxides from the flue gases. In this configuration, the SDA or dry scrubber is typically followed (with respect to a direction of flue gas flow through the system) by a particulate collection device (PCD), advantageously a fabric filter (FF) or baghouse, an electrostatic precipitator (ESP) or even a wet electrostatic precipitator (wet ESP).

Additionally, the present invention can be applied to any SCR catalyst, or even any catalyst that is utilized to reduce $NO_x$, that is adversely affected by poisoning with a phosphorus-based compound such as PO or $P_2O_5$. As such, the present invention is not limited to any one type of SCR catalyst, but rather is broadly applicable to a wide range of SCR catalyst systems. Suitable catalyst systems for which the present invention is applicable include, but are not limited to, honeycomb, plate or corrugated type configurations.

In one embodiment, the present invention is directed to reducing the rate of SCR catalyst deactivation on Powder River Basin (PRB) coal combustion units. It should be noted that although the present invention is described in relation to PRB coal, the present invention is not limited thereto. Rather, the present invention is broadly applicable to any situation where an SCR catalyst is poisoned by one or more phosphorus compounds. As used herein, phosphorus compounds include gaseous phosphorus compounds, aerosol phosphorus compounds, and/or liquid phase phosphorus compounds. As such, the present invention is not limited in application to any one phase of matter, but rather is broadly applicable to controlling a wide range of phosphorus compounds regardless of their phase of matter. The phosphorus compounds of the present invention include, but are not limited to, any one or more phosphorus compounds selected from phosphorus oxide (PO), phosphorus pentoxide ($P_2O_5$), (ortho)phosphoric acid ($H_3PO_4$), pyrophosphoric acid ($H_4P_2O_7$), (ortho)phosphorous acid ($H_3PO_3$), and/or other forms of phosphoric acid. In another embodiment, the phosphorus compounds of the present invention include, but are not limited to, inorganic phosphates, organic phosphates, monophosphate compounds and/or polyphosphate compounds. In still another embodiment, the phosphorus compounds of the present invention include, but are not limited to, inorganic phosphates, organic phosphates, monophosphate compounds and/or polyphosphate compounds in combination with any one or more of phosphorus oxide (PO), phosphorus pentoxide ($P_2O_5$), (ortho)phosphoric acid ($H_3PO_4$), pyrophosphoric acid ($H_4P_2O_7$), (ortho)phosphorous acid ($H_3PO_3$), and/or other forms of phosphoric acid.

While not wishing to be bound to any one theory, it is believed that in one embodiment phosphorus in PRB coal is suspected to cause rapid deactivation in staged and other units. This deactivation is suspected to be caused by the gas phase phosphorus released via carbothermic reduction reaction. In this reaction under oxygen deficient conditions, phosphorus bearing compounds release gas phase phosphorus by the following reaction:

$$P_2O_5 \text{(solid phase compounds)} + 3C(s) \rightarrow 2PO(g) + 3CO(g).$$

This gas phase phosphorus attaches to the active sites within the catalyst causing the deactivation of the sites for $NO_x$ reduction. As a result of this deactivation the SCR catalyst cannot carry out the $NO_x$ reduction process to the same performance level as unused catalyst.

As is known to those of skill in the art, Selective Catalytic Reduction (SCR) represents the most widely used and efficient post-combustion technique for mitigation of $NO_x$ emissions from stationary combustion sources. Currently, at least 286 SCR units have been installed on utility boilers totaling at least 145 GWe of generating capacity in the United States. SCR business represents a significant market for the power generation industry.

The function of an SCR system is to reduce $NO_x$ with ammonia ($NH_3$) and oxygen to form benign products of nitrogen and water, according to following stoichiometric reaction as detailed in reactions (1) to (3):

$$4NO + 4NH_3 + O_2 \rightarrow 4N_2 + 6H_2O \quad (1)$$

$$12NO_2 + 12NH_3 \rightarrow 12N_2 + 18H_2O + 3O_2 \quad (2)$$

$$2NO_2 + 4NH_3 + O_2 \rightarrow 3N_2 + 6H_2O \quad (3).$$

Although not limited thereto, the most common SCR process for coal-fired power plants in US is the high-dust (HD) configuration, in which the SCR catalyst is downstream of economizer and upstream of the precipitator or other particle collection devices. This setup may cause serious catalyst deactivation problems, especially for low-rank coals and biomass fuels that contain both high alkali (mainly sodium and potassium) and alkaline earth (mainly calcium) metals, and sometimes high phosphorus concentrations. Alkali, alkaline earth materials, and phosphorus contribute to both fouling and possibly chemical poisoning of catalysts.

Fuel cost issues as well as strict $SO_2$ and $SO_3$ emission limits have resulted in a significant increase in the number of US utilities burning PRB coals. Many utilities burning PRB coal are now confronted with the necessity of installing SCR units to meet strict $NO_x$ emission limits. There are a number of uncertainties regarding SCR activity performance in PRB coal combustion systems. Unexpected and accelerated deactivation of SCR catalysts in PRB coal combustion has been observed. In addition, concerns over greenhouse gas emission have imposed an intensive demand on biomass combustion to reduce $CO_2$ emission from power generation sources. Burning biomass has caused some serious chemical poisoning problem for SCR catalysts. Therefore, the SCR catalyst deactivation issue for PRB coal and biomass firing units needs to be addressed.

Various field results have verified that phosphorus deposited on the catalyst surface contributes to fast SCR catalyst deactivation. Given such test results, it is indicated that catalyst activity decreases proportionally with the increasing phosphorus content on the catalyst. While not wishing to be bound to any one theory and/or reaction mechanism, a mechanism for the phosphorus attack on catalyst active sites and causing the deactivation is proposed.

In terms of the origin of phosphorus, two mechanisms are proposed: first, there is gas-phase phosphorus generated during the coal or biomass combustion that is able to migrate inside the catalyst; and second, there is/are phosphorus species generated from phosphorus-containing ash particles (e.g., $CaAlPO_4$ fly ash particles) that are deposited on the catalyst surface by reacting with in situ formed $SO_3$ by $SO_2$ oxidation on the SCR catalyst surface.

Gas-phase phosphorus is more concentrated in the post-combustion flue gas of PRB coal relative to bituminous coals, especially for staged combustion. While not wishing to be bound to any one theory and/or reaction mechanism, the reason for high gas-phase phosphorus content in coal combustion may be due to the fact more gas-phase phosphorus is carried over to the SCR units from staged combustion boilers. To date, fast SCR catalyst deactivation has been reported primarily in staged PRB coal combustion. However, as is noted above, the present invention is not limited solely to such staged PRB combustion. Verification is available that illustrates that staged combustion of PRB coals results in adsorption of gas-phase phosphorus in the SCR catalyst and leads to SCR catalyst deactivation. While not wishing to be bound to any one theory and/or reaction mechanism, one such possible mechanism is explained according to FIG. 1. In this scheme, gas phase phosphorus species, existing as $H_3PO_4$ for instance, diffuses into the catalyst pore system, reaches and poisons the active sites, and causes the SCR catalyst deactivation.

Figure 2:
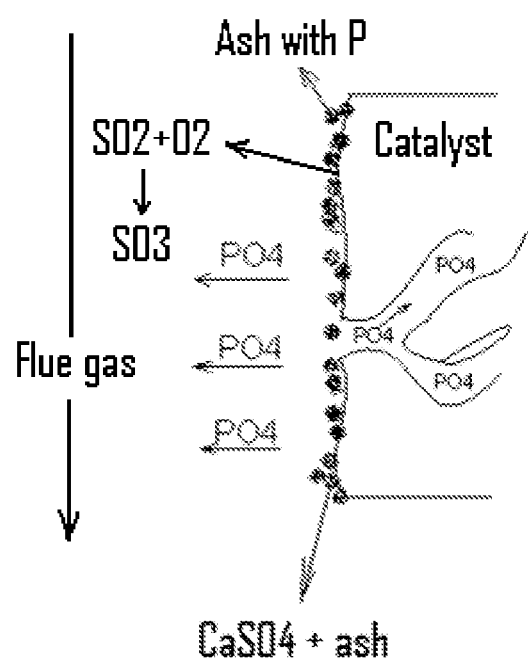
FIG. 2 is an illustration that depicts one possible solid phosphorus poisoning mechanism.

The above mechanism, however, does not exclude the other possible mechanism, where gas-phase phosphorus is released from phosphorus-containing fly ash particles that react with $SO_2$ present in the flue, or combustion, gas, or $SO_3$ generated in situ on the catalyst surface. While not wishing to be bound to any one theory and/or reaction mechanism, one such possible mechanism is explained according to FIG. 2. In conjunction with the mechanism illustrated in FIG. 2 the following reaction is believed to lead to the generation of phosphorus which results in the poisoning of an SCR catalyst as detailed above. Again, the present invention is not limited to just this following explanation. Rather, the present invention is directed to a catalyst composition, and method, to reduce phosphorus poisoning therein.

$$CaPO_x + SO_3 \rightarrow CaSO_4 + PD_x(g) \quad (4)$$

Understanding the deactivation mechanism is necessary for generating a poison-resistant SCR catalyst formulation. Both mechanisms suggest that various phosphorus species that react with active sites in a catalyst and lead to the deactivation of the catalyst. Thus, in one embodiment, this invention is focused on creating means to prevent the poisoning species, which are any of those phosphorus compounds described above, to interact with active sites on the SCR catalysts.

In one embodiment, the present invention provides an effective phosphorus poisoning-resistant catalyst for selective catalytic removal of $NO_x$ from combustion flue gases. Moreover, while not wishing to be bound to any one theory and/or mechanism, in one embodiment, the SCR catalyst formulation of the present invention converts phosphorus species from a poison to an active additive in terms of enhancing the catalyst's $NO_x$ removal efficiency without simultaneously increasing the $SO_2$ conversion.

Figure 3:
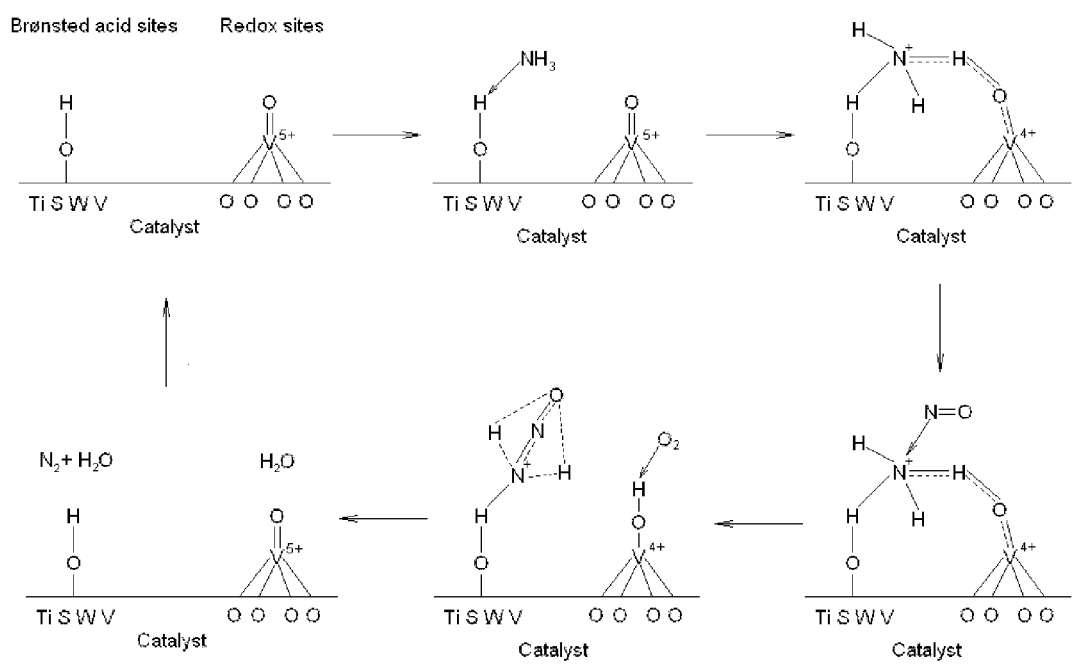
FIG. 3 is an illustration that depicts one possible SCR catalytic reaction mechanism according to the present invention.

While not wishing to be bound to any one theory and/or mechanism, an SCR reaction mechanism according to one embodiment of the present invention is illustrated in FIG. 3. One accepted reaction mechanism for SCR reaction is an Eley-Rideal reaction path, where gas-phase NO reacts with adsorbed and activated $NH_3$ to form benign products of $N_2$ and $H_2O$. The active sites involve both Brønsted acid sites and redox site as indicated in FIG. 3. Commercial SCR catalysts typically contain two elements, vanadium pentoxide and tungstate oxides. Vanadium provides the redox sites, and tungstate oxides supplies most of the Brønsted acid sites.

It has been reported in various sources that phosphorus prefers to react with the vanadium redox sites in typical SCR catalysts to form vanadium-phosphate species. Such reactions have been confirmed by Raman, UV-vis, and EPR analyses (see, e.g., F. Castellino et al., *Applied Catalysis B—Environmental*, Vol. 83 (2008), pp. 110-122). As a result, the corresponding activity data indicate lower $NO_x$ removal efficiency due to the presence of phosphorus on the catalyst as determined by various surface characterization techniques (e.g., EDS, XRF, etc).

Further investigation in connection with the present invention indicates that the phosphorus poisoning mechanism also includes reaction mechanisms where the phosphorus interacts with vanadium and/or vanadia sites and causes catalyst deactivation. While not wishing to be bound to any one theory and/or mechanism, it is believed that phosphorus interacts preferentially with vanadium sites.

Therefore, in one embodiment the present invention supplies at least one compound and/or element to an SCR catalyst that are designed to sequester, bind and/or preferentially react with phosphorus rather than with any vanadium compounds, or metal, that may be present in the SCR catalyst. In one embodiment, the inclusion of such one or more additives, or elements, lead to the sequestration, binding, deactivation, and/or provide protection of, or against, phosphorus, or phosphorus compounds, present in flue, or combustion, gases.

In one embodiment, the at least one additive compound is selected from:
(a) one or more molybdenum compounds, or metal particles;
(b) one or more cobalt compounds, or metal particles;
(c) one or more niobium compounds, or metal particles; and/or
(d) mixtures of any two or more thereof.

Using the parenthetical designations immediately above as shorthand notations, in another embodiment, the at least one additive compound of the present invention is selected from any combination of one or more compounds of (a) with one or more compounds of (b). In another embodiment, the at least one additive compound of the present invention is selected from any combination of one or more compounds of (a) with one or more compounds of (c). In still another embodiment, the at least one additive compound of the present invention is selected from any combination of one or more compounds of (b) with one or more compounds of (c).

In still another embodiment, the at least one additive compound of the present invention is selected from any combination of one or more compounds of (a) with one or more compounds of (b) with one or more compounds of (c).

Experimental results demonstrate that Mo, Co and/or Nb prevent the phosphorus poisoning. In another instance, the present invention yields an embodiment where phosphorus is converted from a poison into an activation agent. Furthermore, flue gas from fossil fuel combustion typically contains $SO_2$. In one embodiment, the one or more additive compounds do not promote, or increase, the $SO_2$ oxidation rate significantly. In one embodiment, the $SO_2$ conversion to $SO_3$ for Mo, Co, Nb, or any combination thereof (as detailed above via the various combinations of (a) through (e)) are below 1 percent. In addition, the new SCR catalysts remained stable and $NO_x$ removal activity proved to be enhanced upon $SO_2$ exposure.

It should be noted that the examples contained therein are non-limiting in nature and the invention is to be broadly construed in light of the disclosure contained herein. In one instance, the catalytic activity of an SCR catalyst activity is measured at 360° C. with and without exposure to 100 ppmv $H_3PO_4$ vapor in the flue gas for about 16 hours.

The chosen additives are incorporated to the conventional SCR catalyst by any suitable impregnation preparation method using any suitable compound to deliver the desired additive compound, or additive metal, selected from those compounds discussed above in (a) through (d), or any combination thereof (as also detailed above). In one instance, any suitable oxide compound of Mo, Co and/or Nb is utilized to impregnate any type of catalyst structure. In one embodiment, the catalyst structure is an SCR catalyst structure having any structure known in the art. Such structures include, but are not limited to, honeycomb, plate or corrugated type configurations. In one embodiment, the catalyst structures of the present invention are porous in nature and the impregnation method of the present invention delivers the one or more additives of the present invention to the pores of the catalyst structure.

In one embodiment, the resulting catalysts are designated $2Mo/1V-9W/TiO_2$ (Mo:V molar ratio equal to 2:1), $2Co/1V-9W/TiO_2$ (Co:V molar ratio equal to 2:1), $2Nb/1V-9W/TiO_2$ (Nb:V molar ratio equal to 2:1). It should be noted that the present invention is not limited solely to a molar ratio of the at least one additive compound, or metal element thereof, to vanadium of 2:1. Rather, any suitable ratio can be utilized including, but not limited to, ratios in the range of about 10:1 to about 1:10, where the first number in the ratio indicates the molar amount of the one or more additive elements selected from Mo, Co and/or Nb and the second number indicates the molar amount of vanadium. In another embodiment, the present invention utilizes a molar ratio of about 9:1 to about 1:9, or from about 8:1 to about 1:8, or from about 7:1 to about 1:7, or from about 6:1 to about 1:6, or from about 5:1 to about 1:5, or from about 4:1 to about 1:4, or from about 3:1 to about 1:3, or from about 2:1 to about 1:2, or even about 1:1. In still another embodiment, the present invention utilizes a molar ratio of about 9.5:1 to about 1:9.5, or from about 8.5:1 to about 1:8.5, or from about 7.5:1 to about 1:7.5, or from about 6.5:1 to about 1:6.5, or from about 5.5:1 to about 1:5.5, or from about 4.5:1 to about 1:4.5, or from about 3.5:1 to about 1:3.5, or from about 2.5:1 to about 1:2.5, or even about 1:1. Here, as well as elsewhere in the specification and claims, individual range values, even those from differing ranges or embodiments, can be combined to form additional and/or non-disclosed ranges.

In one embodiment, the numbers in front of the tungsten and $TiO_2$ portions in the exemplary composition formulas represent the weight percentages of the tungsten and $TiO_2$ portions relative to the total amount of catalytic material present. It should be noted that other support materials besides $TiO_2$ can be utilized in conjunction with the present invention. Accordingly, using $2Mo/1V-9W/TiO_2$ as an example, the ratio of Mo to V is 2:1, while the weight percentages of the tungsten (W) and $TiO_2$ portions is 9 and 1 respectively. Based on these weight percentages, one of skill in the art can calculate the molar ratios of Mo, Co and/or Nb to any of V, W or $TiO_2$ based on the compounds used to provide the desired Mo, Co and/or Nb as well as those used to provide the desired V and W portions of the present invention.

It should be noted that the present invention is not limited solely to the molar ratios presented in the Example formulations. Rather, any suitable ratio can be utilized including, but not limited to, ratios of X to V, where each ratio is independently in the range of about 10:1 to about 1:10, where the first number in the ratio (designated X) indicates the molar amount of the one or more additive elements selected from Mo, Co and/or Nb and the second number indicates the molar amount of vanadium. In another embodiment, the present invention utilizes independent molar ratios selected from about 9:1 to about 1:9, or from about 8:1 to about 1:8, or from about 7:1 to about 1:7, or from about 6:1 to about 1:6, or from about 5:1 to about 1:5, or from about 4:1 to about 1:4, or from about 3:1 to about 1:3, or from about 2:1 to about 1:2, or even about 1:1. In still another embodiment, the present invention utilizes independent molar ratios of X to V selected from about 9.5:1 to about 1:9.5, or from about 8.5:1 to about 1:8.5, or from about 7.5:1 to about 1:7.5, or from about 6.5:1 to about 1:6.5, or from about 5.5:1 to about 1:5.5, or from about 4.5:1 to about 1:4.5, or from about 3.5:1 to about 1:3.5, or from about 2.5:1 to about 1:2.5, or even about 1:1. Here, as well as elsewhere in the specification and claims, individual range values, even those from differing ranges or embodiments, can be combined to form additional and/or non-disclosed ranges.

It should be noted that the present invention is not limited solely to the molar ratios presented in the Example formulations. Rather, any suitable ratio can be utilized including, but not limited to, ratios of X to W, where each ratio is independently in the range of about 3:1 to about 1:35, where the first number in the ratio (designated X) indicates the molar amount of the one or more additive elements selected from Mo, Co and/or Nb and the second number indicates the molar amount of tungsten. In another embodiment, the present invention utilizes independent molar ratios selected from about 2.5:1 to about 1:32.5, or from about 2:1 to about 1:30, or from about 1.5:1 to about 1:27.5, or from about 1:1 to about 1:25, or from about 1:1.5 to about 1:22.5, or from about 1:2 to about 1:20, or from about 1:2.5 to about 1:17.5, or from about 1:3 to about 1:15, or from about 1:4 to about 1:12.5, or from about 1:5 to about 1:10, or even from about 1:6 to about 1:8. Here, as well as elsewhere in the specification and claims, individual range values, even those from differing ranges or embodiments, can be combined to form additional and/or non-disclosed ranges.

In still another embodiment, any suitable ratio can be utilized including, but not limited to, ratios of X to $TiO_2$, where each ratio is independently in the range of about 1:1 to about 1:2000, where the first number in the ratio (designated X) indicates the molar amount of the one or more additive elements selected from Mo, Co and/or Nb and the second number indicates the molar amount of titanium and/or titanium dioxide. In another embodiment, the present invention utilizes independent molar ratios selected from about 1:1.5 to about 1:1750, or from about 1:2 to about 1:1500, or from about 1:2.5 to about 1:1250, or from about 1:3 to about 1:1000, or from about 1:5 to about 1:750, or from about 1:10 to about 1:500, or from about 1:15 to about 1:250, or from about 1:20 to about 1:150, or even about 1:25 to about 1:100. Here, as well as elsewhere in the specification and claims, individual range values, even those from differing ranges or embodiments, can be combined to form additional and/or non-disclosed ranges.

In another embodiment, once the desired ratios of X (where X is selected from any one or more of Mo, Co and/or Nb), V and W are present in the catalyst formulation, the remainder of the catalyst formulation can be composed of $TiO_2$, or other suitable titanium compound or other compound that can be used to form the support or structural portion of the catalyst composition. Thus, in this embodiment, the ratio of X to titanium, or titanium dioxide, is not critical and can be any desired or usable ratio as is known to those of skill in the art.

In one embodiment, the compounds present in the catalyst formulations of the present invention are present individually, or as individual metal oxides. Thus, in this embodiment, the catalyst formulations of the present invention are free of any type of binary metal oxide or ternary metal oxide compound. By "free of" it is meant that the catalyst formulations of the present invention have less than about 5 weight percent, less than about 3 weight percent, less than about 2.5 weight percent, less than about 1 weight percent, less than about 0.5 weight percent, less than about 0.1 weight percent, or even zero weight percent of one or more binary metal oxides, or ternary metal oxides, formed from any suitable combination of one or two of Mo, Co and/or Nb in combination with either one or both of V and W. By "binary metal oxide" it is meant that an oxide compound has two metal elements therein. For example, $X_xY_yO_m$ where X and Y are metals and x, y and m represent numbers (generally expressed as whole numbers) denoting the chemical formula of a binary metal oxide. By "ternary metal oxide" it is meant that an oxide compound has three metal elements therein. For example, $X_xY_yZ_zO_m$ where X, Y and Z are metals and x, y, z and m represent numbers (generally expressed as whole numbers) denoting the chemical formula of a ternary metal oxide. Here, as well as elsewhere in the specification and claims, individual range values, even those from differing ranges or single number ranges, can be combined to form additional and/or non-disclosed ranges.

The corresponding SCR activity before and after 100 ppm $H_3PO_4$ and subsequent 500 ppm $SO_2$ exposure are summarized in Table 1. All the catalyst activities (i.e., k in table 1) are normalized to the SCR activity of fresh conventional SCR catalyst, $1V-9W/TiO_2$.

TABLE 1

SCR Activity Comparison for Conventional and Inventive Catalysts

| Examples | DeNO$_x$, % | K$_{P\,exp}$/K$_{Fresh}$ | K$_{SO2\,exp}$/K$_{Fresh}$ | SO$_2$ to SO$_3$ Conversion, Normalized |
|---|---|---|---|---|
| Conventional, 1V—9W/TiO$_2$ | 81-86 | 0.86 | NA | 1 |
| Mo/1V—9W/TiO$_2$ | 83-93 | 1.04-1.06 | 1.17 | <1 |
| Co/1V—9W/TiO$_2$ | 92-96 | 1.26 | 1.28 | <1 |
| Nb/1V—9W/TiO$_2$ | 82-83 | 1.05 | 1.72 | <1 |

Comparison of the NO$_x$ reduction activities before and after injection, as shown in Table 1, illustrate that conventional SCR catalyst activity drops to 85 percent of its original activity. The new catalyst formulations, however, show improved NO$_x$ reduction activities after phosphorus exposure, and further improvement after one hour of SO$_2$ exposure. Therefore, the above experimental results prove the concept of this invention that one or more additive compounds, metals, or elements, of the present invention yield effective additives to prevent, mitigate, reduce or control the poisoning of new SCR catalysts from phosphorus. In another embodiment, the one or more additives of the present invention not only prevent, mitigate, reduce or control the poisoning of an SCR catalyst from phosphorus, but also turn the phosphorus to an activation agent.

SO$_2$ is a typical gas species presents in the coal combustion flue gas. The resistance to SO$_2$ exposure is critical for the SCR catalysts. The catalyst formulations of the present invention demonstrate tolerance to the SO$_2$ exposure. In another embodiment, the catalyst compositions of the present invention yield an enhanced catalytic effect and/or properties in the presence of SO$_2$.

Even in light of the above, or in addition to it, the experimental results yield confirmation that upon addition to an SCR catalyst formulation of one or more additive compounds in accordance with the present invention there is produced a catalyst formulation that is resistant to, at a minimum, phosphorus poisoning. It should be noted that the present invention is not limited to just the formulations, or examples, contained in Table 1. Rather, the present invention should be broadly construed in light of the various ranges and other disclosure contained above.

In another aspect, the SCR catalyst compositions of the present invention possess favorable SO$_2$ to SO$_3$ oxidation rates: that is, they have a reduced tendency to oxidize SO$_2$ to SO$_3$. In Table 1, the experimental results detail SO$_2$ to SO$_3$ conversion rates for both a conventional catalyst and various catalysts within the scope of the present invention. The conventional SCR catalyst (1V-9W/TiO$_2$) provides a baseline SO$_2$ to SO$_3$ oxidation rate, which is 0.81 percent. For comparison, SO$_2$ to SO$_3$ oxidation rates of various catalyst formulations within the scope of the present invention are normalized to the baseline SO$_2$ to SO$_3$ oxidation rate of the conventional SCR catalyst formulation. That is, the baseline oxidation rate of the conventional catalyst is set to be 1 and then the oxidation rates of the various exemplary catalyst formulations of the present invention are compared to this normalized baseline value for the conventional catalyst. As can be seen from the data contained in Table 1, all of the exemplary formulations of the present invention have SO$_2$ to SO$_3$ oxidation rates that are less than 1 when compared to the normalized baseline value of the conventional catalyst listed in Table 1. Therefore, the exemplary catalysts of the present invention listed in Table 1 do not increase the SO$_2$ to SO$_3$ oxidation rate when compared to the baseline value. As such, in this embodiment, the newly formulated SCR catalysts of the present invention exhibit close to, or less than, the desirable normalized value of 1 for an SO$_2$ to SO$_3$ conversion rate when compared to the baseline value of the conventional listed in Table 1. Thus, in one embodiment, the present invention yields a catalyst that contains one or more additives of the present invention that is useful as an enhanced SCR catalyst that is resistant to phosphorus-poisoning without increasing the SO$_2$ to SO$_3$ oxidation rate when compared to a baseline value of a conventional SCR catalyst. Moreover, in still another embodiment, the SO$_2$ to SO$_3$ oxidation rate can further be adjusted and/or altered by adjusting the ratio of the one or more additives (Mo, Co and/or Nb) of the present invention to the ratio of V in the catalyst formulations of the present invention thereby enabling one to obtain a desirable SCR catalyst in combination with a desired NO$_x$ reduction activity, phosphorus-poisoning resistance, and SO$_2$ to SO$_3$ oxidation rate.

In another instance, the SO$_2$ to SO$_3$ oxidation rate of a catalyst formulation according to the one embodiment of the present invention are about 2 percent or less, or about 1.5 percent or less, or about 1.25 percent or less, or about 1 percent or less, or about 0.9 percent or less, or about 0.8 percent or less, or about 0.75 percent or less, or about 0.7 percent or less, or about 0.6 percent or less, or even about 0.5 percent or less. As would be apparent to those of skill in the art, the $SO_2$ to $SO_3$ oxidation rate of a catalyst formulation is chosen, in part, based upon the fuel being combusted. For example, for coals a higher $SO_2$ to $SO_3$ oxidation rate is acceptable when a low sulfur coal such as PRB coal is utilized. On the other hand, when a higher sulfur coal is utilized (e.g., bituminous coal, etc.) a lower $SO_2$ to $SO_3$ oxidation rate is necessary in order to achieve compliance with various emissions standards.

EXAMPLES

Powder Catalyst Preparation Procedure A

One hundred grams of $TiO_2$ powder (i.e., titania powder) is impregnated via a suitable process (e.g., incipient impregnation) with 50 mL of an aqueous solution prepared by dissolving ammonium metavanadate (a vanadium precursor) and ammonium metatungstate (a tungsten precursor) at a stoichiometric ratio of about 1:3 into an aqueous solution of warm oxalic acid (about 50° C.). After cooling, the precursor solution is added drop wise to the titania powder. The product thus formed is dried at ambient conditions overnight, then at about 120° C. for about 6 hours. This is then followed by a calcination step that is conducted at about 500° C. for about 6 hours. The resulting product is a combination of titania, tungsten oxide and vanadium oxide.

Next, in order to produce one or more of the catalyst formulations in accordance with the present invention, one or more "additives" selected from suitable Mo, Co and/or Nb compounds are added to the combination of titania, tungsten oxide and vanadium oxide produced above. The amount of the one or more additives is/are determined according to any of the molar ratios, or other ratios or numerical ranges, described above (e.g., at a molar ratio of 2:1 when the one or more additives are compared to the amount of vanadium present). In one embodiment, one or more suitable water soluble, or aqueous soluble, molybdenum, cobalt and/or niobium compound, or compounds, is/are utilized. In one embodiment, suitable water soluble, or aqueous soluble, molybdenum, cobalt and/or niobium compounds include, but are not limited to, ammonium heptamolybdate (either the anhydrous form or any hydrated form such as tetrahydrate (i.e., $(NH4)_6Mo_7O_{24}.4H_2O$)), ammonium orthomolybdate (i.e., $(NH_4)_2MoO_4$), hexamminecobalt (II) nitrate, cobalt (II) nitrate, niobium (V) nitrate (i.e., $Nb(NO_3)_5$), niobium oxalate (i.e., $C_2NbO_4$), niobium oxalate, hydrogen (i.e., $Nb(HC_2O_4)_5$, also referred to as columbium (V) oxalate or niobium (V) oxalate), ammonium niobate (V) oxalate hydrate (i.e., $C_4H_4NNbO_4.xH_2O$), or mixtures of any two or more thereof. In another embodiment, other suitable molybdenum, cobalt and/or niobium compound, or compounds, is/are utilized that are not necessarily water, or aqueous soluble, but rather are soluble in an acidic solution.

In this instance, a suitable water soluble, or aqueous soluble, molybdenum compound is utilized and the resulting catalyst is dried at ambient conditions overnight, then at about 120° C. for about 6 hours. This drying step is then followed by calcination at about 500° C. for about 6 hours. After calcination, the catalyst is grounded with an agate mortar and pestle into a powder. Depending upon the application various particles sizes are suitable. As such, the present invention is not limited to any one particle size. After grinding into a powder the catalyst compound of this example can be further processed into any desired form, or shape, using various casting, extrusion, molding, and/or compaction processes.

Powder Catalyst Preparation Procedure B

One hundred grams of $TiO_2$ is impregnated via a suitable process (e.g., incipient impregnation) with 50 mL of an aqueous solution prepared by dissolving ammonium metavanadate (a vanadium precursor), ammonium metatungstate (a tungsten precursor) and one or more suitable additives, as defined above. (in this example the additive is a suitable molybdenum compound as described above) at desired stoichiometric ratios of vanadium to tungsten of about 1:3, of vanadium to titanium of about 1:102, of molybdenum to vanadium of about 2:1 into an aqueous solution of warm oxalic acid (about 50° C.). After cooling, the precursor solution is added drop wise to the titania powder. The catalyst composition so produced is dried at ambient conditions overnight, then at about 120° C. for about 6 hours, followed by calcination at about 500° C. for about 6 hours. After calcination, the catalyst is grounded with an agate mortar and pestle into a powder. Depending upon the application various particles sizes are suitable. As such, the present invention is not limited to any one particle size. After grinding into a powder the catalyst compound of this example can be further processed into any desired form, or shape, using various casting, extrusion, molding, and/or compaction processes.

In summary, the experiment results illustrate new SCR catalyst formulations that are resistant to phosphorus poisoning versus conventional SCR catalyst. Additionally, the SCR catalyst compositions of the present invention achieve an increase in catalytic activity and/or lifespan, remain stable upon $SO_2$ exposure, and exhibit low $SO_2$ to $SO_3$ oxidation rates. In still another embodiment, the catalyst compositions of the present invention yield catalyst compositions that convert phosphorus from a poison to an activation agent. In addition, $SO_2$ exposure also enhances the $NO_x$ reduction activity in one or more of the catalyst compositions in accordance with the present invention.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:
1. A poison-resistant SCR catalyst composition comprising:
   (i) at least one vanadium compound or metal;
   (ii) at least one tungsten compound or metal;
   (iii) at least one titanium compound or metal; and
   (iv) at least one additional compound selected from one or more cobalt compounds or metal, one or more niobium compounds or metal, or mixtures of two or more thereof,
   wherein poison-resistance in the SCR catalyst is achieved due to the molar ratio of the metal portion of component (iv) to the metal portion of component (i) falling in the range of about 10:1 to about 1:10.
2. The catalyst composition of claim 1, wherein the molar ratio of the metal portion of component (iv) to the metal portion of component (i) is in the range of about 9:1 to about 1:9.

3. The catalyst composition of claim 1, wherein the molar ratio of the metal portion of component (iv) to the metal portion of component (i) is in the range of about 8:1 to about 1:8.

4. The catalyst composition of claim 1, wherein the molar ratio of the metal portion of component (iv) to the metal portion of component (i) is in the range of about 7:1 to about 1:7.

5. The catalyst composition of claim 1, wherein the molar ratio of the metal portion of component (iv) to the metal portion of component (i) is in the range of about 4:1 to about 1:4.

6. The catalyst composition of claim 1, wherein the molar ratio of the metal portion of component (iv) to the metal portion of component (i) is in the range of about 3:1 to about 1:3.

7. The catalyst composition of claim 1, wherein the molar ratio of the metal portion of component (iv) to the metal portion of component (i) is in the range of about 2:1 to about 1:2.

8. The catalyst composition of claim 1, wherein the molar ratio of the metal portion of component (iv) to the metal portion of component (i) is about 2:1.

9. The catalyst composition of claim 1, wherein the molar ratio of the metal portion of component (iv) to the metal portion of component (ii) is in the range of about 3:1 to about 1:35.

10. The catalyst composition of claim 1, wherein the molar ratio of the metal portion of component (iv) to the metal portion of component (iii) is in the range of about 1:1 to about 1:2000.

11. The catalyst composition of claim 1, wherein the catalyst composition contains less than about 5 weight percent of one or more binary metal oxides, or ternary metal oxides, formed from any suitable combination of one or two of Co and/or Nb in combination with either one or both of V and W.

12. The catalyst composition of claim 1, wherein the catalyst composition contains less than about 2.5 weight percent of one or more binary metal oxides, or ternary metal oxides, formed from any suitable combination of one or two of Co and/or Nb in combination with either one or both of V and W.

13. The catalyst composition of claim 1, wherein the catalyst composition contains less than about 1 weight percent of one or more binary metal oxides, or ternary metal oxides, formed from any suitable combination of one or two of Co and/or Nb in combination with either one or both of V and W.

14. The catalyst composition of claim 1, wherein the catalyst composition contains less than about 0.5 weight percent of one or more binary metal oxides, or ternary metal oxides, formed from any suitable combination of one or two of Co and/or Nb in combination with either one or both of V and W.

15. The catalyst composition of claim 1, wherein the catalyst composition is free of any one or more binary metal oxides, or ternary metal oxides, formed from any suitable combination of one or two of Co and/or Nb in combination with either one or both of V and W.

16. The catalyst composition of claim 1, wherein the catalyst composition has an $SO_2$ to $SO_3$ conversion, or oxidation, rate that is about 2 percent or less.

17. The catalyst composition of claim 1, wherein the catalyst composition is resistant to phosphorus poisoning.

18. A poison-resistant SCR catalyst composition comprising:
   (i) at least one vanadium compound or metal;
   (ii) at least one tungsten compound or metal;
   (iii) at least one titanium compound or metal; and
   (iv) at least one additional compound selected from one or more cobalt compounds or metal, one or more niobium compounds or metal, or mixtures of two or more thereof, wherein poison-resistance in the SCR catalyst is achieved due to: (a) the molar ratio of the metal portion of component (iv) to the metal portion of component (i) falling in the range of about 10:1 to about 1:10; (b) the molar ratio of the metal portion of component (iv) to the metal portion of component (ii) falling in the range of about 3:1 to about 1:35; and (c) the molar ratio of the metal portion of component (iv) to the metal portion of component (iii) falling in the range of about 1:1 to about 1:2000.

19. The catalyst composition of claim 18, wherein the molar ratio of the metal portion of component (iv) to the metal portion of component (i) is in the range of about 9:1 to about 1:9.

20. The catalyst composition of claim 18, wherein the molar ratio of the metal portion of component (iv) to the metal portion of component (i) is in the range of about 8:1 to about 1:8.

21. The catalyst composition of claim 18, wherein the molar ratio of the metal portion of component (iv) to the metal portion of component (i) is in the range of about 7:1 to about 1:7.

22. The catalyst composition of claim 18, wherein the molar ratio of the metal portion of component (iv) to the metal portion of component (i) is in the range of about 4:1 to about 1:4.

23. The catalyst composition of claim 18, wherein the molar ratio of the metal portion of component (iv) to the metal portion of component (i) is in the range of about 3:1 to about 1:3.

24. The catalyst composition of claim 18, wherein the molar ratio of the metal portion of component (iv) to the metal portion of component (i) is in the range of about 2:1 to about 1:2.

25. The catalyst composition of claim 18, wherein the molar ratio of the metal portion of component (iv) to the metal portion of component (i) is about 2:1.

26. The catalyst composition of claim 18, wherein the molar ratio of the metal portion of component (iv) to the metal portion of component (ii) is in the range of about 2.5:1 to about 1:32.5.

27. The catalyst composition of claim 18, wherein the molar ratio of the metal portion of component (iv) to the metal portion of component (iii) is in the range of about 1:1.5 to about 1:1750.

28. The catalyst composition of claim 18, wherein the catalyst composition contains less than about 5 weight percent of one or more binary metal oxides, or ternary metal oxides, formed from any suitable combination of one or two of Co and/or Nb in combination with either one or both of V and W.

29. The catalyst composition of claim 18, wherein the catalyst composition contains less than about 2.5 weight percent of one or more binary metal oxides, or ternary metal oxides, formed from any suitable combination of one or two of Co and/or Nb in combination with either one or both of V and W.

30. The catalyst composition of claim 18, wherein the catalyst composition contains less than about 1 weight percent of one or more binary metal oxides, or ternary metal oxides, formed from any suitable combination of one or two of Co and/or Nb in combination with either one or both of V and W.

31. The catalyst composition of claim 18, wherein the catalyst composition contains less than about 0.5 weight percent of one or more binary metal oxides, or ternary metal oxides, formed from any suitable combination of one or two of Co and/or Nb in combination with either one or both of V and W.

32. The catalyst composition of claim 18, wherein the catalyst composition is free of any one or more binary metal oxides, or ternary metal oxides, formed from any suitable combination of one or two of Co and/or Nb in combination with either one or both of V and W.

33. The catalyst composition of claim 18, wherein the catalyst composition has an $SO_2$ to $SO_3$ conversion, or oxidation, rate that is about 2 percent or less.

34. The catalyst composition of claim 18, wherein the catalyst composition is resistant to phosphorus poisoning.

35. A method for increasing the active life of a catalyst and/or preventing, reducing, mitigating and/or controlling phosphorus poisoning in an SCR catalyst, the method comprising the steps of:
(a) providing at least one SCR catalyst composition, the SCR catalyst composition comprising:
(i) at least one vanadium compound or metal;
(ii) at least one tungsten compound or metal;
(iii) at least one titanium compound or metal; and
(iv) at least one additional compound selected from one or more cobalt compounds or metal, one or more niobium compounds or metal, or mixtures of two or more thereof,
wherein the molar ratio of the metal portion of component (iv) to the metal portion of component (i) is in the range of about 10:1 to about 1:10; and
(b) supplying a $NO_x$-containing gas to the catalyst and at least one other compound to permit the catalyst to control $NO_x$ by the conversion of $NO_x$ into another nitrogen compound or nitrogen ($N_2$) gas,
wherein the catalyst composition is resistant to phosphorus poisoning due to at least the molar ratio of component (iv) to component (i).

36. The method of claim 35, wherein the at least one other compound is ammonia and the catalyst composition is an SCR catalyst.

37. The method of claim 35, wherein the method is applied to combustion, waste or flue gasses of a combustion process selected from a fossil fuel powered mobile, or stationary, combustion process, a biomass combustion process, or a waste combustion process.

38. The method of claim 35, wherein the molar ratio of the metal portion of component (iv) to the metal portion of component (i) is in the range of about 9:1 to about 1:9.

39. The method of claim 35, wherein the molar ratio of the metal portion of component (iv) to the metal portion of component (i) is in the range of about 8:1 to about 1:8.

40. The method of claim 35, wherein the molar ratio of the metal portion of component (iv) to the metal portion of component (i) is in the range of about 7:1 to about 1:7.

41. The method of claim 35, wherein the molar ratio of the metal portion of component (iv) to the metal portion of component (i) is in the range of about 4:1 to about 1:4.

42. The method of claim 35, wherein the molar ratio of the metal portion of component (iv) to the metal portion of component (i) is in the range of about 3:1 to about 1:3.

43. The method of claim 35, wherein the molar ratio of the metal portion of component (iv) to the metal portion of component (i) is in the range of about 2:1 to about 1:2.

44. The method of claim 35, wherein the molar ratio of the metal portion of component (iv) to the metal portion of component (i) is about 2:1.

45. The method of claim 35, wherein the molar ratio of the metal portion of component (iv) to the metal portion of component (ii) is in the range of about 3:1 to about 1:35.

46. The method of claim 35, wherein the molar ratio of the metal portion of component (iv) to the metal portion of component (iii) is in the range of about 1:1 to about 1:2000.

47. The method of claim 35, wherein the catalyst composition contains less than about 5 weight percent of one or more binary metal oxides, or ternary metal oxides, formed from any suitable combination of one or two of Co and/or Nb in combination with either one or both of V and W.

48. The method of claim 35, wherein the catalyst composition contains less than about 1 weight percent of one or more binary metal oxides, or ternary metal oxides, formed from any suitable combination of one or two of Co and/or Nb in combination with either one or both of V and W.

49. The method of claim 35, wherein the catalyst composition has an $SO_2$ to $SO_3$ conversion, or oxidation, rate that is about 2 percent or less.

* * * * *